May 12, 1925.
F. M. GOOSSEN
1,537,765
VEHICLE DUMPING BODY
Filed July 24, 1923
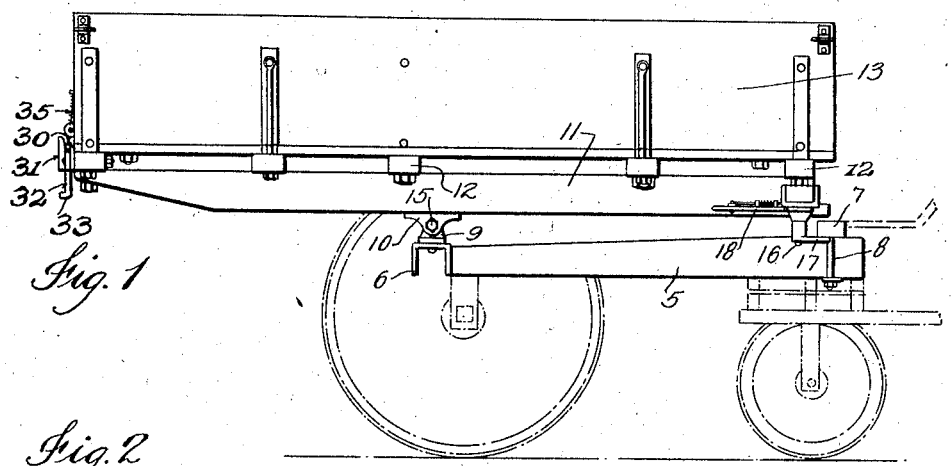
Fig. 1
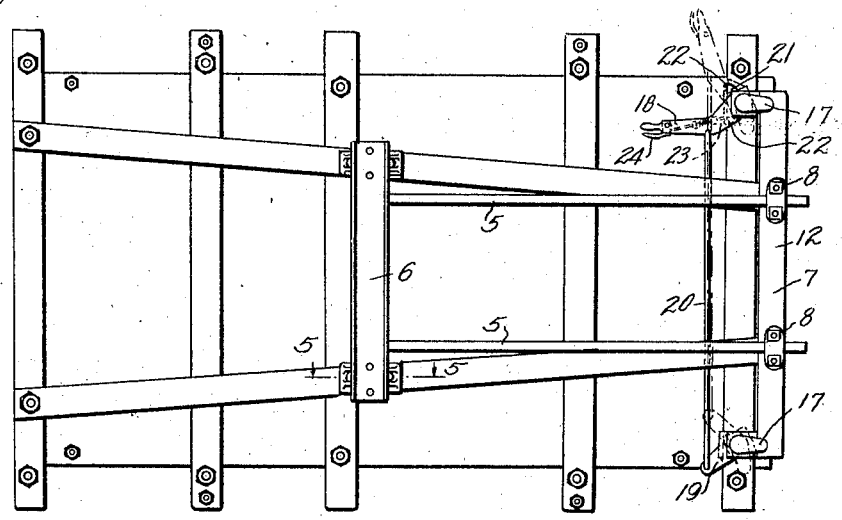
Fig. 2
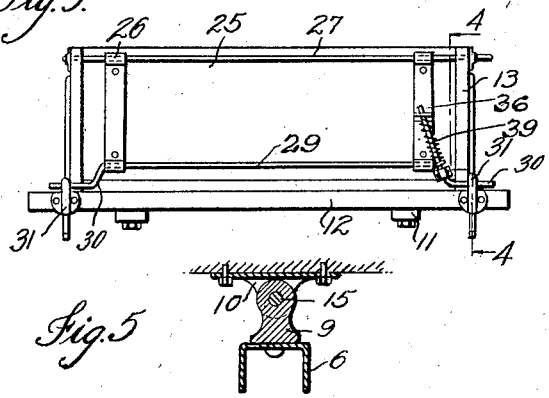
Fig. 3
Fig. 5
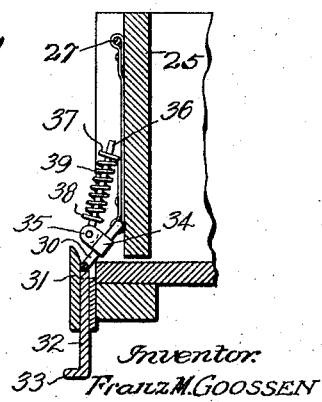
Fig. 4
Inventor:
Franz M. Goossen
By Attorneys Patented May 12, 1925.

1,537,765

UNITED STATES PATENT OFFICE.

FRANZ M. GOOSSEN, OF HILLSBORO, KANSAS.

VEHICLE DUMPING BODY.

Application filed July 24, 1923. Serial No. 653,573.

*To all whom it may concern:*

Be it known that I, FRANZ M. GOOSSEN, a citizen of the United States, and a resident of Hillsboro, in the county of Marion and State of Kansas, have invented a new and Improved Vehicle Dumping Body, of which the following is a full, clear, and exact description.

The present invention relates to new and useful improvements in dumping wagons.

It is one of the primary objects of the present invention to provide a new and improved means for securely holding the body of the wagon against dumping movement.

It is a further object of the invention to construct the means for releasing the dumping body of the wagon in such a manner that it is locked in either its retaining or releasing position.

It is a further object of the invention to provide a new and improved form of end gate lock for dumping bodies.

It is a still further object of the invention to provide a new and improved frame for supporting the wagon body.

With the above and other objects in view, reference is had to the accompanying drawings, in which Figure 1 is a view in side elevation of a dumping wagon constructed in accordance with the present invention;

Fig. 2 is a bottom plan view thereof;

Fig. 3 is a view in end elevation of the dumping body showing the end-gate-latching means;

Fig. 4 is a detail sectional view on an enlarged scale taken on the line 4—4 of Fig. 3 and showing the end-gate-locking means.

Fig. 5 is a detail section view of the body supporting hinge.

Referring more particularly to the drawings, the reference character 5 designates the main frame of the vehicle, and said frame is composed of channel iron or other suitable material and comprises two side elements which are connected at their rear ends by means of a transversely-extending member 6, preferably of inverted channel form. Connecting the front ends of these members 5, and positioned upon the upper face thereof is a transversely-extending member 7, secured to the members 5 by bolts or the like, 8. The transversely-extending member 6 at the rear of the members 5 carries one element 9 of a hinge, the other element 10 of said hinge being secured to the longitudinally-extending bar 11, of which there are two, which form the frame of the wagon box, or body per se. Connecting the two members 11 are transversely-extending braces 12, forming the actual support for the body 13. The members 11 each carry a hinge element 10, and said hinge elements 9 and 10 are connected together by means of bolts 15 and serve to form the means about which the body 13 pivots during the dumping operation.

Pivotally mounted by means of a bolt 16, and arranged at each end of the forward transverse brace 12, is a hook member 17. One of these hook members is provided with an operating lever 18, connected to a bell crank lever 19, secured to the opposite hook member 17 by a tie rod, or the like, 20. By this construction, as the lever 18 is rocked about its pivotal point, both of the hook members 17 will be moved either into engagement with the lower face of the forward transverse member 7 or out of engagement therewith, dependent upon the direction of operation of the lever 18.

Secured to the transversely-extending member 12, adjacent the operating lever 18, is a plate 21, and said plate 21 has notches 22 therein, and adapted to engage with said notches 22 is a dog 23 operated by a trigger 24 carried by the hand lever 18.

By this mechanism it is apparent that in either of the extreme positions of the lever 18, the same is locked against accidental displacement.

The body 13 is provided with an end gate 25, which gate is pivotally mounted as at 26, upon a transversely-extending rod 27 mounted in the side boards of the body 13. The reference character 28 designates a transversely-extending rod pivoted at 29 to the end gate 25. This transversely-extending rod 28 has offset portions 30, which are adapted to engage behind hooks 31 carried by the rear transverse member 12 of the body frame. As more clearly shown in Fig. 4, these hooks 31 are spaced from the body and slidably mounted behind the hooks are pushers or the like, 32, having offset ends 33, forming feet, the purpose of which will be hereinafter described.

Secured to one of the offset portions 30 of the transversely-extending rod 28, is a clip 34, and pivotally connected to said clip 34, as at 35 is a rod 36. The upper end of the rod 36 slides in a guide 37, and interposed between a collar carried by the rod 36 and the guide 37, is a coil spring 39.

The device operates in the following manner:

When the body is in the position shown in Fig. 1, with the hook members 17 engaged beneath the transversely-extending member of the frame and it is desired to dump the wagon body, it is only necessary to rock the lever 18 until the hook members 17 are disengaged from beneath the transversely-extending members 7, when the body 13 is free to move about its pivotal point, i. e., the hinges upon which it is mounted, to dump the contents thereof.

As the body moves to dumping position, the feet 33 of the pushing members 32 will engage the ground and said pushing members will disengage the offset portions 30 of the transversely-extending member 28 from behind the members 31, and thus permit the end gate to swing to open position to discharge the contents of the body 13.

By this construction it is apparent that the present invention provides a dumping body which is constructed in such a manner that the body is locked against dumping operation. Furthermore, a dumping vehicle body constructed in accordance with the present invention has an automatically operated end gate, by means of which the contents of the body are automatically discharged upon dumping operation thereof.

What is claimed is:

1. An end gate for dumping vehicles comprising in combination with a vehicle body, an end gate member pivotally carried by the body, a plurality of hook members carried by the body, a latch carried by the end gate member and adapted to engage behind the hook members, and ground-engaging means carried by the hook members and adapted to disengage the latch from the hook members upon the body moving to dumping position.

2. An automatic latch for vehicle body end gates, comprising in combination with a pivoted end gate, a plurality of rigid hook members carried by the wagon body, a transversely-extending latch member having offset ends carried by the end gate and adapted to engage behind the hook members carried by the body, resilient means for maintaining said offset ends in engagement with the hook members carried by the body, and a reciprocating pushing means associated with said hooks adapted to disengage the offset ends of the latch member from their respective hook members to permit of the end gate swinging to open position.

3. An automatic latch for vehicle body end gates, comprising in combination with a pivoted end gate, a plurality of rigid hook members carried by the wagon body, a transversely-extending latch member having offset ends carried by the end gate and adapted to engage behind the hook members carried by the body, resilient means for maintaining said offset ends in engagement with the hook members carried by the body, and pushing members adapted to engage the ground when the body is moved to dumping position, said pushing members serving to disengage the offset ends of the latch member with their respective hook members to permit the end gate swinging to open position.

FRANZ M. GOOSSEN.